June 21, 1932.  W. SPÄTH  1,863,948
MEANS OF CONVERTING ELECTRICAL ENERGY INTO ROTARY OSCILLATION OF A MASS
Filed Aug. 20, 1927

Patented June 21, 1932

1,863,948

UNITED STATES PATENT OFFICE

WILHELM SPÄTH, OF BARMEN, GERMANY

MEANS OF CONVERTING ELECTRICAL ENERGY INTO ROTARY OSCILLATION OF A MASS

Application filed August 20, 1927, Serial No. 214,389, and in Germany July 2, 1925.

This invention relates to electric oscillation motors, and has in view to provide a motor of this character involving a novel combination and arrangement of elements suitable for a wide range of uses, and which is strong, durable and thoroughly reliable and efficient in operation.

A special object of the invention is to provide a design permitting a strong rotor or oscillator construction of very light weight.

Another object of the invention is to provide a design which permits of the amplitude of oscillation of the rotor being variably predetermined.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claims.

Figure 1:
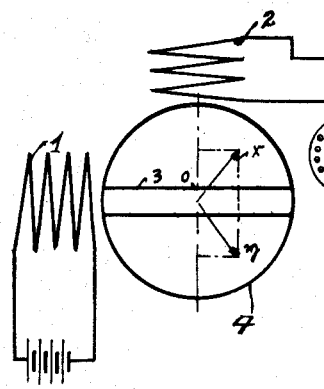
Figure 1 is a diagrammatic view illustrating the mode of operation of the motor.

Referring first to Figure 1 of the drawing, wherein is illustrated the principle underlying the operation of the invention, 1 and 2 designate a pair of coils which may be arranged with their axes at any desired angle relative to one another within a limit of ninety degrees and which are adapted to be supplied, respectively, with direct and alternating current. The magnetic fields of these two coils give a resultant magnetic vector whose direction in space varies periodically as illustrated in Figure 1 by the two vectors OX and OY. At 3 is designated a short circuit coil suitably formed on an armature core 4 and so disposed relative to the windings 1 and 2 as to have an alternating current generated therein by the resulting flux of the coils 1 and 2 when the latter are energized. This gives an alternate turning movement of the rotor 4 about the axis O thereof at a rate corresponding to the frequency of the exciting alternating current.

Figure 2:
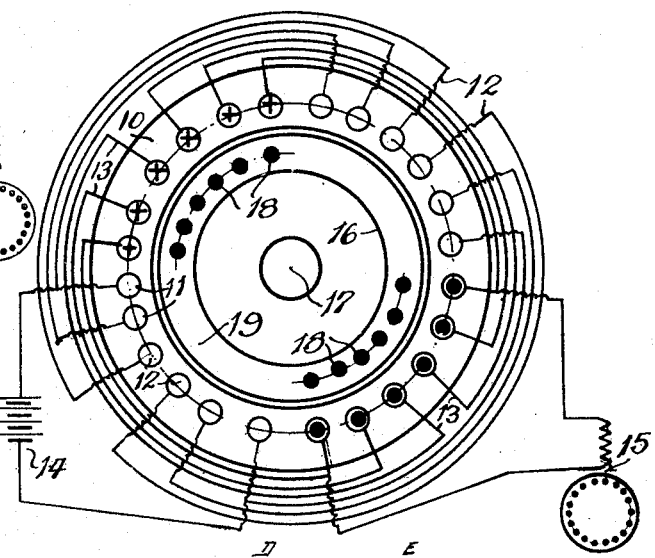
Figure 2 is a diagrammatic view illustrating a specific embodiment of the invention.

In Figure 2 of the drawing is illustrated one manner in which a practical oscillation motor may be constructed to operate in accordance with the principle illustrated in Figure 1. According to this embodiment of the invention an iron core 10 in the form of a hollow cylinder is slotted as indicated at 11 for the reception of two sets of windings designated as 12 and 13, respectively, which are disposed at right angles to one another and which are adapted to be supplied with direct and alternating currents from the two sources designated as 14 and 15, respectively. Within the core 10 is disposed the iron body of a rotor or oscillator 16 which is suitably mounted for oscillation about the axis 17 and which carries a set of conductor bars 18 connected with end rings 19 to form a rotor of the well known squirrel cage type. The operation of this embodiment of the invention will be readily understood by referring to the description of Figure 1, windings 12 and 13 of Figure 2 corresponding, respectively, to the coils 1 and 2 of Figure 1 and the bars 18 and the rotor 16 of Figure 2 corresponding, respectively, to the coil 3 and the core 4 of Figure 1.

According to the showing in Figure 2 of the drawing all of the coils of the winding 12 are disposed directly adjacent to one another and all of the coils of the winding 13 are disposed directly adjacent to one another, and since, as aforesaid, the windings 12 and 13 are disposed at right angles to one another, the result is that the rotor will have a ninety degree amplitude of oscillation.

Figure 3:
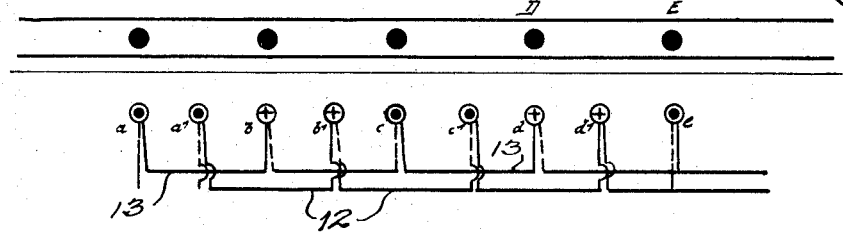
Figures 3 and 4 are diagrammatic views illustrating how the amplitude of oscillation of the rotor or oscillator may be variably predetermined.
Figure 4:
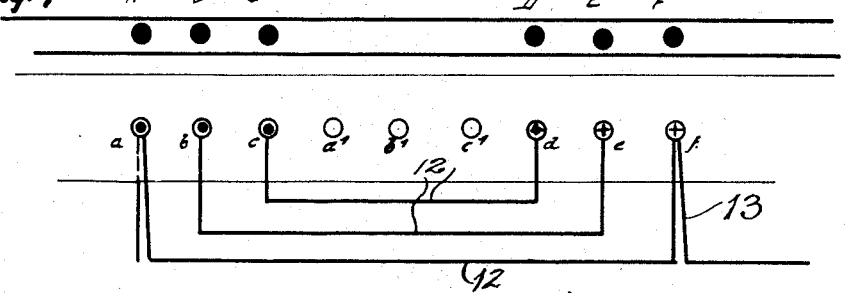

However, it is apparent that by alternating the coils of the winding 12 with those of the winding 13 the degree of oscillation of the rotor will be considerably less than ninety degrees and a minimum depending upon the spacing of the coils 12 and 13. This is illustrated in Figure 3 which shows the coils 12 alternated with respect to the coils 13, in view of which it is further apparent that the degree of oscillation of the rotor may be variably predetermined as desired between ninety degrees and a minimum simply by disposing the coils of the windings 12 and 13 in alternate multiples. This is illustrated in Figure 4 for example wherein the coils of the windings 12 and 13 are shown in alternate multiples of three coils.

Figure 5:
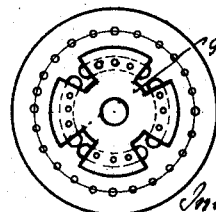
Figure 5 is a diagrammatic end view of a motor constructed in accordance with the invention and illustrating the rotor constructed for oscillation independent of the iron body of the rotor.

In view of the foregoing it is apparent that instead of the rotor bars being carried by the iron of the rotor and oscillating therewith, said bars may be carried by suitable disks illustrated at $g'$ in Figure 5 for rotation about an iron core disposed inwardly with respect to the bars. This design obviously permits the construction of a very light and durable rotor.

I claim:

1. An oscillation motor comprising a stator, a rotor, a pair of windings carried by the stator to be supplied, respectively, with direct and alternating currents, said windings being disposed relative to one another to produce when energized an oscillating magnetic field and being spacially displaced to produce instantaneously variable, oscillatory resultant flux distribution, and a winding carried by the rotor adapted to be energized by induction and disposed in the oscillating magnetic field whereby oscillation of the rotor is produced.

2. An oscillation motor comprising a stator, a rotor, a pair of windings carried by the stator to be supplied, respectively, with direct and alternating currents, the coils of each winding being disposed in a group adjacent to one another and separate from the coils of the other winding, said windings being disposed relative to one another to produce when energized an oscillating magnetic field, and a winding carried by the rotor adapted to be energized by induction and disposed in the oscillating magnetic field whereby oscillation of the rotor is produced.

3. An oscillation motor comprising a stator, a rotor, a pair of windings carried by the stator to be supplied, respectively, with direct and alternating currents, the coils of the respective windings being alternated with respect to one another, said windings being disposed relative to one another to produce when energized an oscillating magnetic field, and a winding carried by the rotor adapted to be energized by induction and disposed in the oscillating magnetic field whereby oscillation of the rotor is produced.

4. An oscillation motor comprising a stator, a rotor, a pair of windings carried by the stator to be supplied, respectively, with direct and alternating currents, the coils of the respective windings being arranged in groups and the groups of the respective windings being alternated with respect to one another, said windings being disposed relative to one another to produce when energized an oscillating magnetic field, and a winding carried by the rotor adapted to be energized by induction and disposed in the oscillating magnetic field whereby oscillation of the rotor is produced.

In testimony whereof I affix my signature.

WILHELM SPÄTH.